(12) United States Patent
Car

(10) Patent No.: US 10,704,437 B2
(45) Date of Patent: Jul. 7, 2020

(54) EXHAUST SYSTEM FOR AN INTERNAL COMBUSTION ENGINE AND METHOD FOR OPERATING SUCH AN EXHAUST SYSTEM

(71) Applicant: VOLKSWAGEN AKTIENGESELLSCHAFT, Wolfsburg (DE)

(72) Inventor: Onur Ulas Car, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 2 days.

(21) Appl. No.: 15/970,507

(22) Filed: May 3, 2018

(65) Prior Publication Data

US 2018/0320570 A1 Nov. 8, 2018

(30) Foreign Application Priority Data

May 4, 2017 (DE) .......................... 10 2017 109 626

(51) Int. Cl.
*F01N 3/035* (2006.01)
*F01N 3/021* (2006.01)
(Continued)

(52) U.S. Cl.
CPC ............ *F01N 3/035* (2013.01); *F01N 3/005* (2013.01); *F01N 3/021* (2013.01); *F01N 3/2066* (2013.01);
(Continued)

(58) Field of Classification Search
CPC ............... F01N 13/008; F01N 13/0093; F01N 2240/26; F01N 2250/02; F01N 2560/026;
(Continued)

(56) References Cited

U.S. PATENT DOCUMENTS 9,551,262 B1 1/2017 Zhang
2008/0078170 A1 4/2008 Gehrke et al.
(Continued)

FOREIGN PATENT DOCUMENTS

DE 36 36 967 A1 5/1988
DE 10 2010 027 984 A1 10/2011
(Continued)

OTHER PUBLICATIONS

English Translation of JP-03206314 to Uno, Akikore (Year: 1991).*
(Continued)

*Primary Examiner* — Audrey K Bradley
*Assistant Examiner* — Anthony Ayala Delgado
(74) *Attorney, Agent, or Firm* — Pearl Cohen Zedek Latzer Baratz LLP

(57) ABSTRACT

An exhaust system for an internal combustion engine is connected to an outlet of the internal combustion engine and has a particulate filter. A differential pressure line for ascertaining the particulate filter load connects a section of the exhaust passage upstream from the particulate filter and a section of the exhaust passage downstream from the particulate filter to a differential pressure sensor. At an end of the differential pressure line facing the exhaust passage, a reservoir which serves to collect condensate protrudes into the exhaust passage and can be heated up by the exhaust gas in the exhaust passage. Due to the heating of the reservoir, the liquid that has collected in the reservoir evaporates and can be introduced in gaseous form into the exhaust passage through an opening in the reservoir, so that the risk of droplet formation in the exhaust passage is avoided.

12 Claims, 5 Drawing Sheets

(51) Int. Cl.
  *F01N 13/00* (2010.01)
  *F01N 3/00* (2006.01)
  *F01N 3/20* (2006.01)

(52) U.S. Cl.
  CPC ........ *F01N 13/008* (2013.01); *F01N 13/0093* (2014.06); *F01N 2240/26* (2013.01); *F01N 2250/02* (2013.01); *F01N 2560/026* (2013.01); *F01N 2560/08* (2013.01)

(58) Field of Classification Search
  CPC ...... F01N 2560/08; F01N 3/005; F01N 3/021; F01N 3/035; F01N 3/2066
  See application file for complete search history.

(56) References Cited

U.S. PATENT DOCUMENTS

| | | | |
|---|---|---|---|
| 2008/0092526 A1* | 4/2008 | Kunkel | B01F 3/04049 60/286 |
| 2015/0132187 A1* | 5/2015 | Takaoka | F01N 3/2066 422/111 |

FOREIGN PATENT DOCUMENTS

| | | | | |
|---|---|---|---|---|
| DE | 102013209783 | A1 | 12/2013 | |
| DE | 10 2013 215 594 | A1 | 2/2015 | |
| DE | 10 2016 119 115 | A1 | 4/2017 | |
| EP | 0 268 026 | A1 | 5/1988 | |
| EP | 1515011 | A1 | 3/2005 | |
| EP | 2444608 | A1 | 4/2012 | |
| FR | 3032229 | A1 | 8/2016 | |
| JP | 03206314 | A * | 9/1991 | ............ F01N 3/206 |
| JP | 2010229957 | A * | 10/2010 | |
| WO | WO 2008/042048 | A1 | 4/2008 | |

OTHER PUBLICATIONS

English Translation of JP-2010229957 to Nadanami, Norihiko (Year: 2010).*
Search report for European Patent Application No. 18170387.7, dated Jun. 28, 2018.
Search report for German Patent Application No. 10 2017 109 626.4, dated Jan. 9, 2018.

* cited by examiner

EXHAUST SYSTEM FOR AN INTERNAL COMBUSTION ENGINE AND METHOD FOR OPERATING SUCH AN EXHAUST SYSTEM

CROSS-REFERENCE TO RELATED APPLICATIONS

This application claims priority from German Patent Application No. 10 2017 109 626.4, filed May 4, 2017, which is incorporated by reference in its entirety.

FIELD OF THE INVENTION

The invention relates to an exhaust system for an internal combustion engine, as well as to a method for operating such an exhaust system according to the generic parts of the independent claims.

BACKGROUND OF THE INVENTION

Current legislation on exhaust-gas emissions, which will become increasingly stringent in the future, makes high requirements in terms of the raw engine emissions and the after-treatment of the exhaust gas of internal combustion engines. In this context, the requirements for a greater reduction in fuel consumption and the further tightening of the emissions standards in terms of the permissible nitrogen oxide emissions ($NO_x$ emissions) pose a challenge to design engineers. In the case of gasoline engines, the exhaust gas is cleaned in a known manner by a three-way catalytic converter as well as by additional catalytic converters installed upstream and downstream from the three-way catalytic converter. Diesel engines currently make use of exhaust after-treatment systems having an oxidation catalytic converter or $NO_x$ storage catalytic converter, a catalytic converter for the selective catalytic reduction of nitrogen oxides (SCR catalytic converter) as well as a particulate filter to separate out soot particles, and if applicable, additional catalytic converters. In this context, ammonia is preferably used as the reducing agent. Since the handling of pure ammonia is laborious, vehicles normally employ a synthetic, aqueous urea solution that is mixed with the hot stream of exhaust gas in a mixing apparatus situated upstream from the SCR catalytic converter. This mixing process causes the aqueous urea solution to heat up, whereby the aqueous urea solution releases ammonia in the exhaust passage. A commercially available, aqueous urea solution generally consists of 32.5% urea and 67.5% water.

In view of the current and future legislation on exhaust-gas emissions, there is an increasing need for stricter adherence to the nitrogen oxide limit values, particularly in the case of motor vehicles with diesel engines. Exhaust after-treatment systems having an SCR catalytic converter or $NO_x$ storage catalytic converter located near the engine as well as a diesel particulate filter located near the engine are able to meet the current requirements, but such exhaust after-treatment systems are rapidly approaching their functional limits. Moreover, the further tightening of the emissions standards requires enlarging the volume of the catalytic converters and the volume of the particulate filter, reducing the exhaust-gas counter-pressure, and providing additional exhaust-gas sensors that serve to achieve improved regulation and to reduce the raw emissions of the internal combustion engine, and that serve for the onboard diagnosis of the exhaust after-treatment components. In order to analyze the exhaust gas, an additional $NO_x$ sensor can be installed downstream from the particulate filter, especially downstream from a differential pressure line for monitoring the particulate filter load. In this process, however, condensate droplets can be entrained by the exhaust-gas mass flow of the differential pressure line and, upon reaching the sensor, these droplets can cause a malfunction or even a complete failure of the sensor.

German patent application DE 10 2013 215 595 A1 discloses an exhaust system for an internal combustion engine, whereby a pressure sensor is provided on a particulate filter, whereby a pipe forms a connection line between the exhaust passage of the internal combustion engine and the pressure sensor. In this context, it is provided that this connection line is configured in such a way that condensation water flows out of the connection line into the exhaust passage in order to prevent the connection line from icing up at low temperatures.

International patent application WO 2008/042048 A1 discloses a method for thermal management in an exhaust system of an internal combustion engine. Here, the exhaust passage can have a line that connects the intercooler of the internal combustion engine to the exhaust passage. In this process, condensate that has been deposited on the intercooler can be utilized for the thermal management of the exhaust system.

A drawback of the prior-art approaches, however, is that water in the form of droplets can get into the exhaust passage and consequently, the problem of a potential malfunction or complete failure of a sensor in the exhaust passage, especially of a $NO_x$ sensor, caused by the dripping of water droplets is not solved.

SUMMARY OF THE INVENTION

Before this backdrop, the invention is based on the objective of putting forward an exhaust after-treatment device for an internal combustion engine, preventing water in droplet form from penetrating into the exhaust passage and thus ruling out damage to the sensor in the exhaust passage.

According to the invention, this objective is achieved by means of an exhaust system for an internal combustion engine, whereby the exhaust system of the internal combustion engine is connected to the outlet of the internal combustion engine. The exhaust system has an exhaust passage in which a particulate filter is arranged. A differential pressure line connects a first section of the exhaust passage upstream from the particulate filter and/or a second section of the exhaust passage downstream from the particulate filter to a differential pressure sensor, so that a pressure differential over the particulate filter can be detected that constitutes a measure of the load of the particulate filter with soot particles. At an end of the differential pressure line facing the exhaust passage, a reservoir is formed which is fluidically connected to the exhaust passage and which protrudes into the exhaust passage, whereby the reservoir can be heated up by the exhaust gas of the internal combustion engine in such a way that liquid that has collected in the reservoir evaporates before exiting into the exhaust passage, after which it is introduced in gaseous form into the exhaust passage. The reservoir can capture and collect the condensate so that no liquid droplets can get into the exhaust passage via condensate present in the differential pressure line. Here, the reservoir is arranged in the exhaust passage so that it can be quickly, simply and cost-effectively heated up by the hot exhaust gas in the exhaust passage and it subsequently evaporates. The evaporated condensate can then be introduced into the exhaust passage without any problem since no further droplet formation needs to be expected here, and the gas does not cause any damage to the sensors. In this context, the reservoir can be situated on a first section 90 of the differential pressure line that connects the exhaust passage 18 upstream from the particulate filter 16 to the differential pressure sensor 84 as well as on a second section 92 of the differential pressure line 20 that connects the exhaust passage 18 downstream from the particulate filter 16 to the differential pressure sensor 84.

The features cited in the dependent claims constitute advantageous improvements and refinements of the exhaust system put forward in the independent claim.

In a preferred embodiment of the invention, it is provided that a sensor—especially a $NO_x$ sensor that detects the nitrogen oxide concentration, a temperature sensor and/or a particle sensor—is arranged in the exhaust system downstream from the reservoir. When the exhaust gas of diesel engines is cleaned by means of exhaust systems located near the engine, there is an oxidation catalytic converter or a $NO_x$ storage catalytic converter located near the engine as well as a particulate filter, preferably a particulate filter having a coating that serves for the selective, catalytic reduction of nitrogen oxides. In this context, a $NO_x$ sensor with which the concentration of nitrogen oxides remaining after the cleaning of the exhaust gas can be measured is provided downstream from the particulate filter and downstream from the opening of the differential pressure line. In order to prevent damage to this sensor caused by the impact of liquid droplets, especially of condensation water coming from the differential pressure line, a reservoir is provided at the end of the differential pressure line facing the exhaust passage, especially on the second section of the differential pressure line, thus preventing liquid from penetrating into the exhaust passage downstream from the particulate filter.

According to a preferred embodiment of the invention, it is advantageously provided for an opening or a slit to be formed on the reservoir so that the liquid that has collected in the reservoir can be released into the exhaust passage in a controlled manner. Primarily, the opening or the slit has the function of establishing a fluidic connection between the differential pressure line and the exhaust passage so as to allow a pressure measurement. In addition, this slit or this opening can be used in order to allow the condensate to be introduced into the exhaust passage in a controlled manner after it has evaporated. This prevents the condensate from dripping into the exhaust passage in an uncontrolled manner.

It is particularly preferable here for the opening or the slit to be arranged in such a way that a liquid is prevented from exiting the opening or the slit due to gravity, whereas a gaseous medium can escape into the exhaust passage through the opening or the slit. Due to the fact that one end of the reservoir is closed off and is filled with condensate due to gravity, the condensate can be collected without dripping into the exhaust passage. In this context, the reservoir is provided with an opening or a slit which is situated geodetically above the closed-off end and therefore only allows the condensate to be released into the exhaust passage once the condensate has evaporated and is then released into the exhaust passage due to the pressure gradient. Here, the opening or the slit is located on a side of the reservoir facing away from the exhaust gas stream as seen in the direction of flow of the exhaust gas through the exhaust passage so as to prevent exhaust gas from penetrating into the reservoir.

In another preferred embodiment of the invention, it is provided that a trailing edge is formed on the reservoir in order to prevent a volume flow from the reservoir from accumulating on a wall of the exhaust passage. Particularly in the case of a cold exhaust passage after a cold start of the internal combustion engine, this can prevent liquid from condensing again on the wall of the exhaust passage, which would again give rise to liquid droplets in the exhaust passage downstream from the particulate filter. Moreover, it is possible to avoid local concentrations of the liquid which could otherwise impair the function or durability of a component for the exhaust after-treatment situated downstream from the particulate filter.

According to another improvement of the exhaust system, it is advantageously provided for the downstream end of the differential pressure line to open up into an exhaust-gas funnel directly downstream from a filter body of the particulate filter. This accounts for an especially compact configuration of the exhaust system according to the invention, in addition to which the funnel minimizes the dynamic pressure downstream from the particulate filter, so that an improved detection of the load state of the particulate filter can be achieved.

In a preferred embodiment of the invention, it is provided for the differential pressure line to branch off from the exhaust passage upstream from a branch for a low-pressure exhaust-gas return line and for it to once again open up into the exhaust passage downstream from the branch for the low-pressure exhaust-gas return line. Since the differential pressure line opens up downstream from the low-pressure exhaust-gas return line, the $NO_x$ sensor can provide very precise information about the residual content of nitrogen oxides since no additional exhaust-gas return takes place downstream from the place where the differential pressure line opens up. Consequently, the nitrogen oxide concentration measured at the $NO_x$ sensor corresponds to the tailpipe emissions or to the inlet emissions of another component for the exhaust after-treatment in the exhaust passage downstream from the particulate filter, which is preferably situated in the undercarriage of the motor vehicle.

According to another, advantageous improvement of the invention, it is provided that the reservoir is made of sheet metal. It is especially simple and inexpensive to make the reservoir using sheet metal. In this context, a simple manufacturing method, for instance, a stamping process or a stamping-bending process, can be used to make a slit or an opening in the metal sheet and the desired geometry of the metal sheet can be created. Moreover, a slit can also be created through the shaping of the metal sheet.

In this context, it is preferable for the metal sheet to be screwed into the exhaust passage. The installation is particularly easy when the metal sheet is screwed into the exhaust passage. Here, the metal sheet, which has preferably been shaped in a bending or deep-drawing process, forms the reservoir which can then be screwed into the exhaust passage in a simple manner. In this context, the installation through an exhaust-gas funnel downstream from the filter body of the particulate filter is facilitated since the larger diameter in comparison to the rest of the exhaust passage allows a simpler installation.

As an alternative, it is advantageously provided for the metal sheet to be positively and/or non-positively connected to the differential pressure line. Owing to the connection of the metal sheet to the differential pressure line, the reservoir can be inserted through a connection opening for the differential pressure line and thus it can be pre-assembled as a module with the differential pressure line. This simplifies the installation of the exhaust passage.

In another improvement of the invention, it is provided that the sensor—especially the $NO_x$ sensor, the temperature sensor or the particle sensor—is arranged in the exhaust passage at a distance of 120 mm to 1500 mm downstream from the filter body of the particulate filter. The $NO_x$ sensor is intended to detect the nitrogen oxide concentration in the exhaust passage downstream from the particulate filter. In order to achieve the most compact design possible and, if applicable, to provide space for additional components of the exhaust after-treatment system downstream from the particulate filter, it is advantageous for the $NO_x$ sensor to be arranged at a distance of 120 mm to 1500 mm, especially preferably between 120 mm and 250 mm, downstream from the filter body of the particulate filter. In this context, the evaporation of the liquid in the reservoir makes it possible to prevent the condensate droplets from striking the $NO_x$ sensor, despite the short distance between the filter body and the $NO_x$ sensor.

According to the invention, a method for the aftertreatment of the exhaust gas of an internal combustion engine is being put forward, whereby the exhaust gas of the internal combustion engine is conveyed through an exhaust system having an exhaust passage. In this process, the exhaust gas of the internal combustion engine is cleaned by a particulate filter. The exhaust system has a differential pressure line that connects a first section of the exhaust passage upstream from the particulate filter and/or a second section of the exhaust passage downstream from the particulate filter to a differential pressure sensor. At an end of the differential pressure line facing the exhaust passage, a reservoir is formed which is fluidically connected to the exhaust passage and which protrudes into the exhaust passage, whereby the reservoir is heated up by the exhaust gas of the internal combustion engine in such a way that liquid that has collected in the reservoir evaporates before exiting into the exhaust passage, after which it is introduced in gaseous form into the exhaust passage. Thanks to the method according to the invention, condensate from the differential pressure line can be prevented from getting into the exhaust passage in liquid form, where it could cause a malfunction of a sensor or of a component of the exhaust after-treatment system.

Unless otherwise indicated in a specific case, the various embodiments of the invention cited in this application can be advantageously combined with each other.

BRIEF DESCRIPTION OF THE DRAWINGS

The invention will be explained below on the basis of embodiments with reference to the accompanying drawings. Identical components or components having the same function are designated in the figures by the same reference numerals. The following is shown.

DETAILED DESCRIPTION OF THE INVENTION

Figure 1:
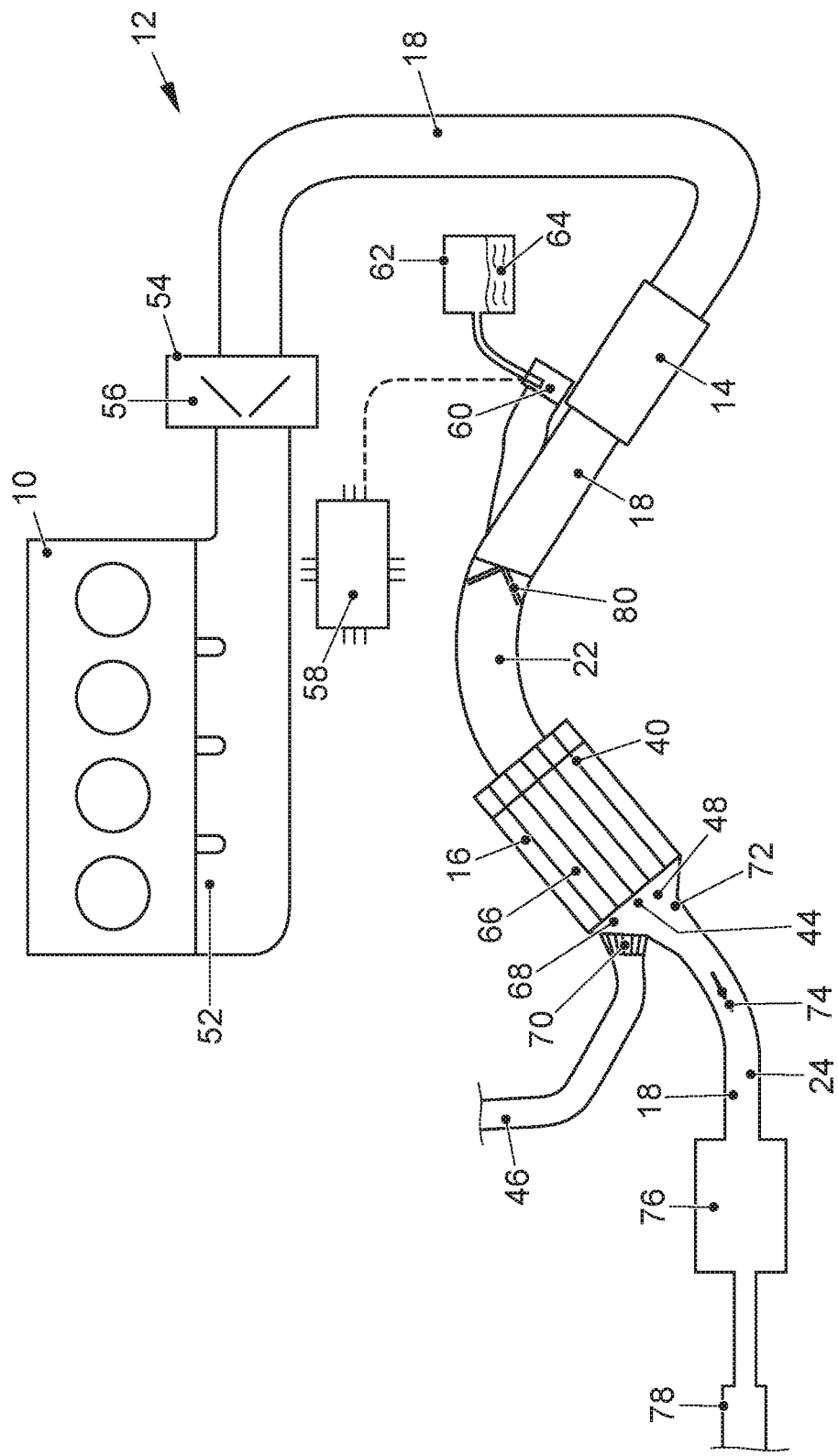
FIG. 1 is an embodiment of an internal combustion engine with an exhaust system according to the invention, in a schematic view.

FIG. 1 shows an embodiment of an internal combustion engine 10 with an exhaust system 12 according to the invention. The internal combustion engine 10 is preferably configured as a diesel engine that is self-ignited through compression. As an alternative, the internal combustion engine 10 can also be configured as a gasoline engine that is externally ignited by means of an ignition device, especially as a gasoline engine with direct fuel injection. The internal combustion engine 10 has an outlet 52 that is connected to the exhaust system 12. The exhaust system 12 comprises a first catalytic converter 14, preferably a diesel oxidation catalytic converter or a $NO_x$ storage catalytic converter, and a particulate filter 16 that is installed downstream from the first catalytic converter 14 and that preferably has a coating 66 for the selective catalytic reduction of nitrogen oxides (SCR coating). The exhaust system 12 also has an exhaust passage 18 that connects the outlet 52 to a tailpipe 78 of the exhaust system 12. In this context, a first section 22 of the exhaust passage 18 connects the outlet 52 of the internal combustion engine 10 to the particulate filter 16. In this first section 22, a turbine 56 of an exhaust-gas turbocharger 54 is preferably arranged downstream from the outlet 52 and upstream from the first catalytic converter 14. Moreover, a metering element 60 that serves to meter in a reducing agent 64, especially an aqueous urea solution stored in a reducing agent tank 62, is arranged in the first section 22 of the exhaust passage 18.

The particulate filter 16 has one inlet and two outlets. In this context, the first outlet of the particulate filter 16 is connected to a low-pressure exhaust-gas return line 46 by means of which the exhaust gas can be admixed with fresh air upstream from a compressor of the exhaust-gas turbocharger 54 that is driven by the turbine 56 in order to lower the raw emissions when the fuel-air mixture is being burned in the combustion chambers of the internal combustion engine 10. The second outlet of the particulate filter 16 is connected to a second section 24 of the exhaust passage 18 of the exhaust system 12, said passage also being referred to as the main passage. The second section 24 of the exhaust passage 18 connects the particulate filter 16 to the tailpipe 78 of the exhaust system 12. An additional catalytic converter 76, especially an additional catalytic converter for the selective catalytic reduction of nitrogen oxides, can be arranged in the main passage—especially in a place in the undercarriage of the motor vehicle where the internal combustion engine 10 with an exhaust system 12 according to the invention is installed—in order to achieve an additional cleaning of the exhaust gas. As an alternative, the additional catalytic converter 76 can also widen the temperature window within which at least one of the two exhaust aftertreatment components 14, 76 for the selective catalytic reduction of nitrogen oxides allows an efficient conversion of nitrogen oxides.

Preferably, the first catalytic converter 14 and the particulate filter 16 are both arranged near the engine. In this context, the term "arranged near the engine" refers to an arrangement having an exhaust-gas travel distance of 80 cm at the maximum, preferably of 60 cm at the maximum, starting from the outlet 52 of the internal combustion engine 10. In this context, if the particulate filter 16 is configured with an SCR coating 66, it should be ensured that the mixing segment between the first catalytic converter 14 and the particulate filter 16 is long enough to allow the reducing agent 64 that has been metered into the exhaust passage 18 to mix with the exhaust gas before entering the particulate filter 16. In order to shorten the length of the mixing segment, the section of the exhaust passage 18 between the first catalytic converter 14 and the particulate filter 16 has a bend of approximately 60°, as a result of which the deflection causes the exhaust gas to swirl, and consequently, the reducing agent 64 is uniformly distributed in the exhaust passage 18 over a relatively short mixing segment. Moreover, the section of the exhaust passage 18 can have a mixing element 80 to further improve the thorough mixing of the exhaust gas stream with the reducing agent 64. At the particulate filter 16 downstream from the filter body 40 in the flow direction of the exhaust gas through the particulate filter 16, there is a branch 44 where the exhaust passage 18 branches off into a low-pressure exhaust-gas return line 46 and a main passage that connects the particulate filter 16 to the tailpipe 78 of the exhaust system 12. For this purpose, downstream from the filter body 40, the particulate filter 16 has an exhaust-gas funnel 48 that branches off into a second funnel 68 and into a third funnel 72. In this context, the second funnel 68 is connected to the low-pressure exhaust-gas return line 46. Moreover, in order to prevent the penetration of soot particles into the low-pressure exhaust-gas return line 46, the second funnel 68 has a filter element 70. The third funnel 72 has a larger diameter than the second funnel 68 and it connects the particulate filter 16 to the main passage of the exhaust system 12.

Due to the fact that exhaust-gas legislation is becoming increasingly stringent, particularly with respect to nitrogen oxide emissions, engine-internal measures have to be combined with measures pertaining to the exhaust after-treatment. One way to improve the raw emissions of the internal combustion engine 10 consists of admixing exhaust gas with the fresh air in order to reduce the formation of nitrogen oxide emissions. In this process, it is advantageous for the returned exhaust gas to be as cool as possible. For this reason, a low-pressure exhaust-gas return cooler can be arranged in the low-pressure exhaust-gas return line 46. In addition, an exhaust-gas valve 74 can be arranged in the main passage of the exhaust system 12 and it can influence the amount of exhaust gas fed to the low-pressure exhaust-gas return line 46.

The internal combustion engine 10 also comprises a control unit 58 with which the amount of fuel fed to the combustion chambers of the internal combustion engine 10 can be controlled or regulated. Moreover, the control unit 58 serves to actuate the exhaust system according to the invention and, for example, to control the amount of reducing agent 56 that is metered into the exhaust passage 18 or to control the regeneration of the particulate filter 16.

Figure 2:
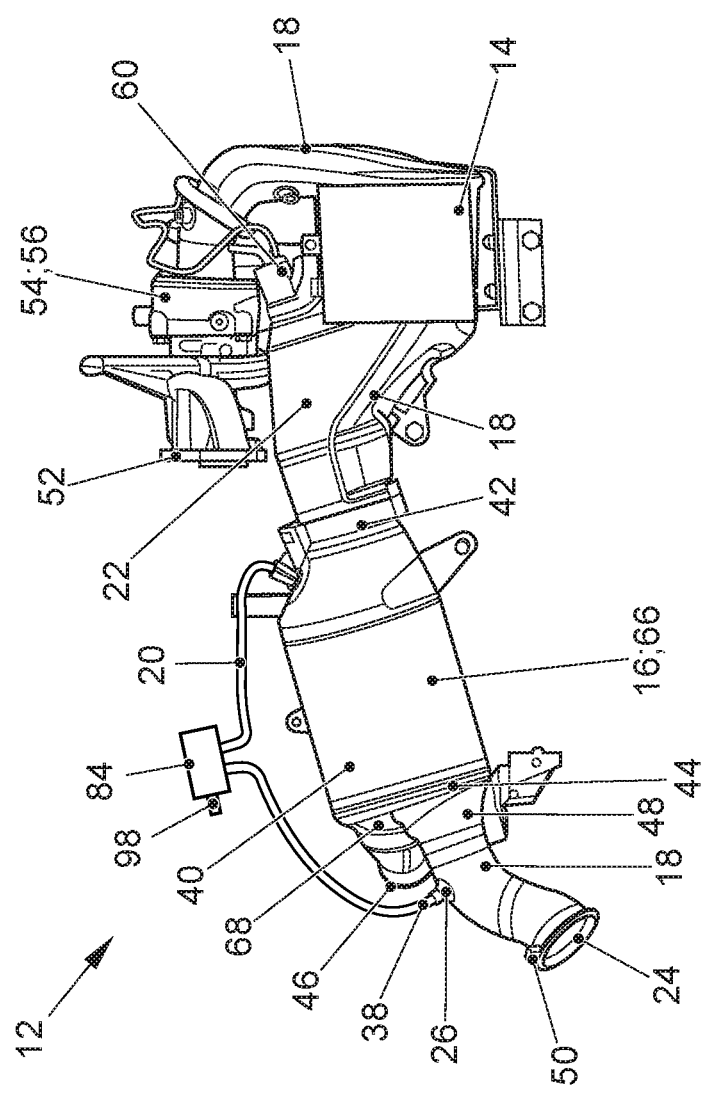
FIG. 2 is an exhaust system according to the invention for an internal combustion engine, in a three-dimensional view.

In FIG. 2, the exhaust system 12 according to the invention of an internal combustion engine 10 is shown in a three-dimensional view. Thanks to the exhaust-gas 12 according to the invention, a minimum exhaust-gas counterpressure can be implemented in a design that is compact and space-saving. In this context, the exhaust system 12 has an exhaust-gas turbocharger 54 which is arranged directly adjoining the outlet 52 of the internal combustion engine 10 and whose turbine 56 is powered by exhaust gas from the internal combustion engine 10. The exhaust system 12 has a differential pressure line 20 that connects the first section 22 of the exhaust passage 18 upstream from the particulate filter 16 to the first inlet 94 of a differential pressure sensor 84 via a first section 90 of the differential pressure line 20. A second section 24 of the exhaust passage 18 is connected to a second inlet 96 of the differential pressure sensor 84 via a second section 92 of the differential pressure line 20. The differential pressure sensor 84 also has an electric contact 98 by means of which the detected pressure signal can be relayed to the control unit 58, where it is then processed. At the downstream end 38 of the differential pressure line 20, there is a reservoir 26 in which the condensate being formed in the differential pressure line 20 can accumulate. A $NO_x$ sensor is provided downstream from the particulate filter 16 and downstream from the opening of the differential pressure line 20. The downstream end 38 of the differential pressure line 20 is depicted in greater detail in FIG. 3.

Figure 3:
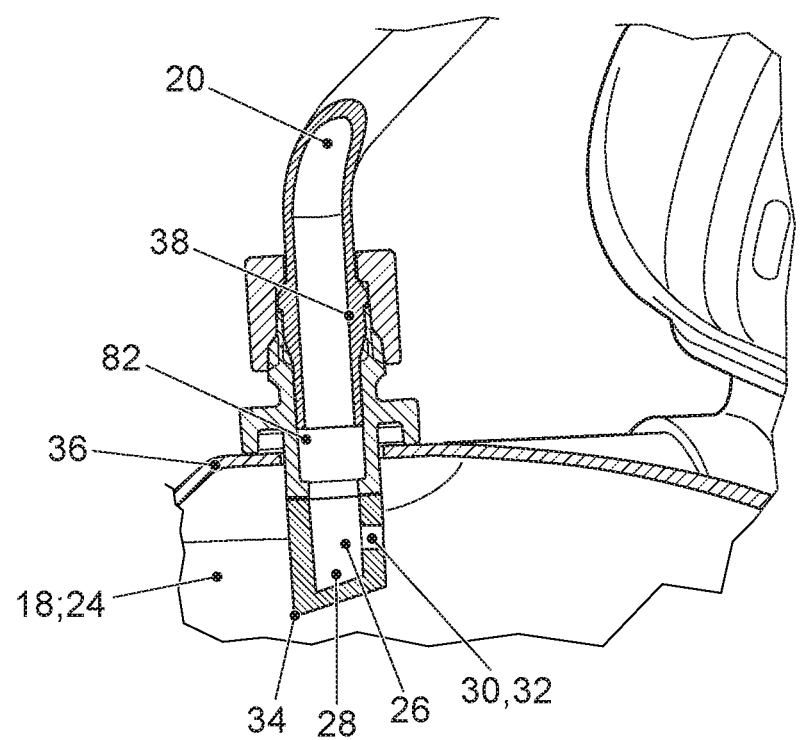
FIG. 3 is an end section of a differential pressure line facing the exhaust passage, with a reservoir.

FIG. 3 shows the downstream end 38 of the differential pressure line 20 facing the exhaust passage 18. The differential pressure line 20 is affixed to the exhaust passage 18 by means of a connecting piece 82 on the wall 36.

A reservoir 26 with a collecting area for the condensate as well as with at least one opening 30 or one slit 32 is formed at the downstream end 38 of the differential pressure line 20. Liquid 28 that has condensed out can be captured in this collecting area so that it does not drip into the exhaust passage 18 in an uncontrolled manner. Here, the reservoir 26 protrudes into the exhaust passage 18 in order to promote the heating up and evaporation of the liquid 28 that has collected in the reservoir 26. In this context, the slit 32 or the opening 30 is arranged in such a way that the pressure in the segment of the exhaust passage can be ascertained. Moreover, the slit 32 or the opening is arranged in such a manner that the liquid 28 has to rise from the collecting area against the force of gravity in order to exit from the reservoir and to enter the exhaust passage 18, so that an uncontrolled dripping of the condensate into the exhaust passage 18 is prevented. On the reservoir 26, there is a trailing edge 34 in order to promote the mixing of the evaporated condensate with the exhaust gas as well as to prevent large amounts of the condensate from collecting on the wall 36 of the exhaust passage 18, where it could condense again under unfavorable operating conditions.

Figure 4:
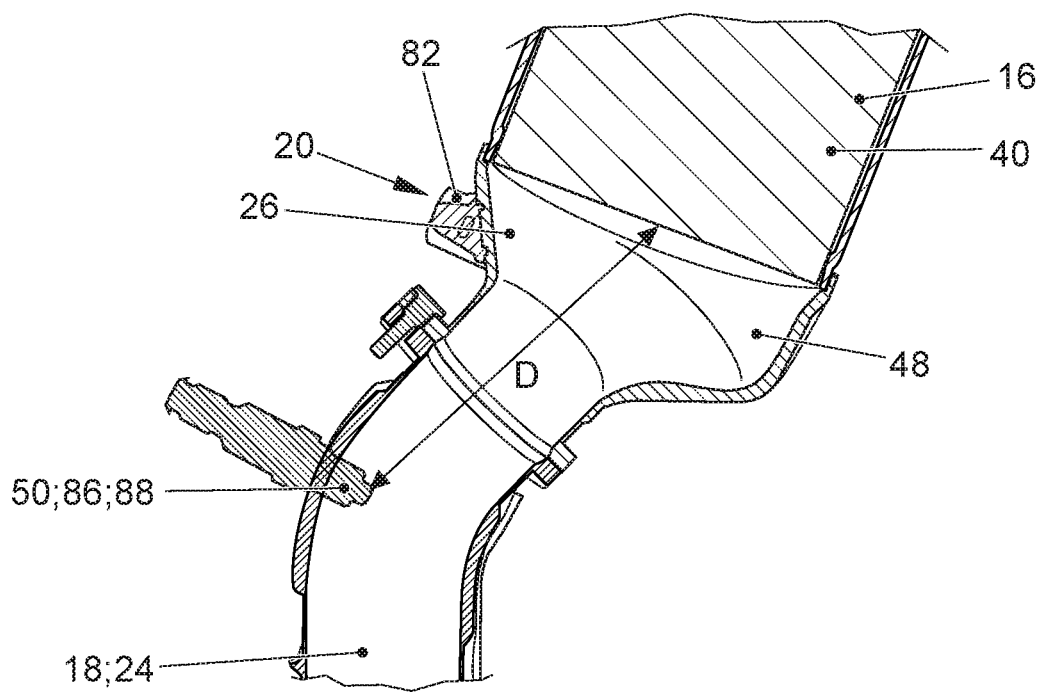
FIG. 4 is another view of a section of an exhaust system according to the invention.

FIG. 4 shows another embodiment of an exhaust system 12 according to the invention, whereby, for the sake of clarity, only the section 24 downstream from the particulate filter 16 is depicted. A connecting piece 82 for the differential pressure line 20 is formed on the second section 24 of the exhaust passage 18. Downstream from the filter body 40 of the particulate filter 16 and downstream from the connecting piece 82, a $NO_x$ sensor is arranged on the exhaust passage 18 in order to detect the nitrogen oxide concentration downstream from the particulate filter 16 and thus to check the function of the exhaust after-treatment in the case of a particulate filter 16 having an SCR coating 66. As an alternative or in addition, the $NO_x$ sensor 50 can also be used to detect the nitrogen oxide concentration upstream from a second catalytic converter 76 (not shown in FIG. 4) where it meters an appropriate amount of reducing agent into the exhaust passage 18. The $NO_x$ sensor 50 is installed at a distance of approximately 150 mm downstream from the filter body 40 of the particulate filter 16, thus translating into a compact design of the exhaust system 12 according to the invention.

Figure 5:
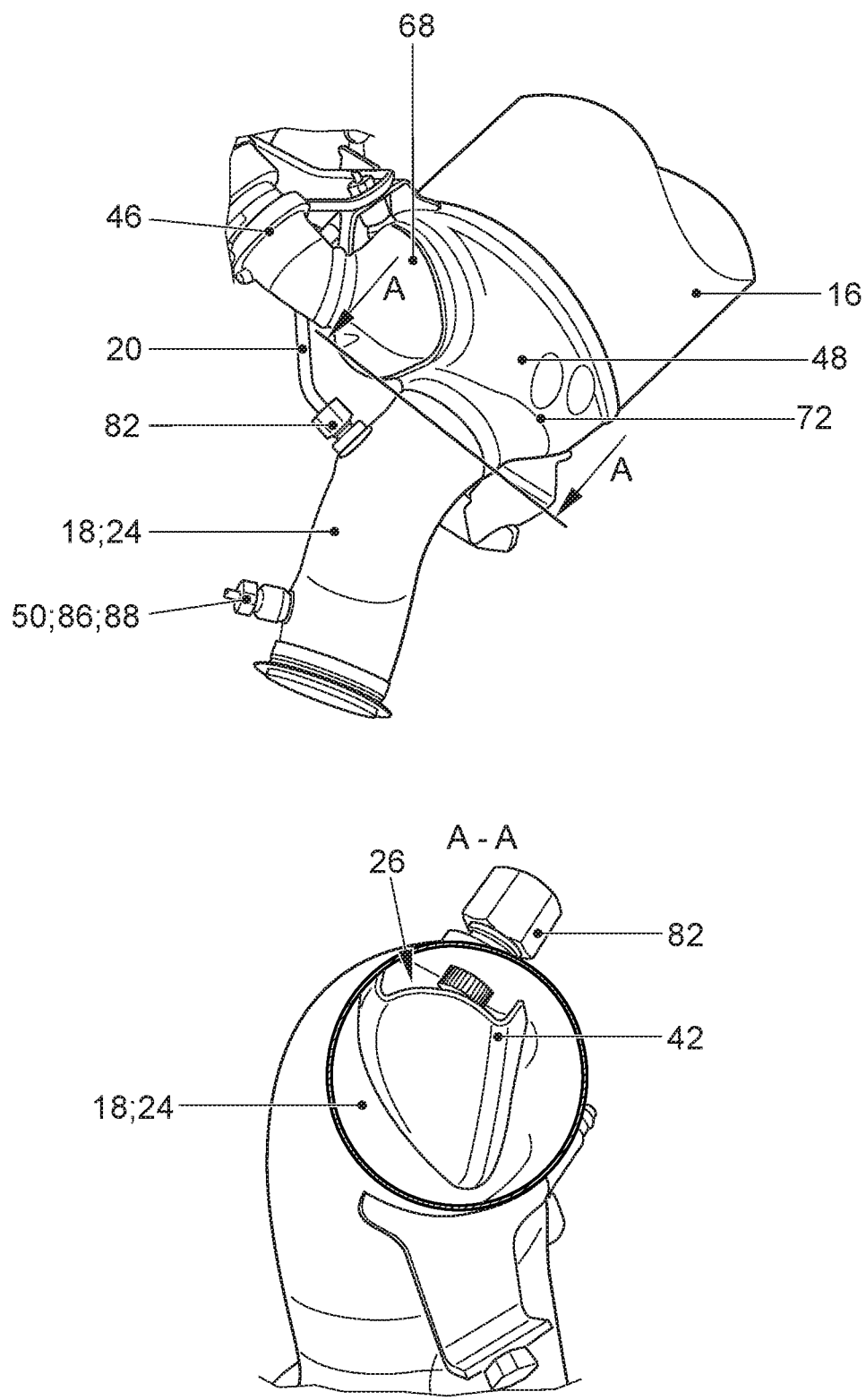
FIG. 5 is a section of an exhaust system according to the invention, showing the particulate filter as well as an adjoining section of the exhaust passage downstream from the particulate filter.

FIG. 5 shows another embodiment of an exhaust system 12 according to the invention. Here, the exhaust passage 18 branches off at the exhaust-gas funnel 48 into the low-pressure exhaust-gas return line 46 and into a main passage of the exhaust system 12 where the differential pressure line 20 is attached by means of a connecting piece 82. Here, the reservoir 26 consists of a metal sheet 42 that is inserted into the exhaust passage 18 and preferably screwed or welded to it.

During operation and especially after operation of the exhaust system 12, water vapor and/or reducing agent can condense out in the differential pressure line and it can then accumulate in the form of liquid droplets on the wall of the differential pressure line and can accumulate in the reservoir 26 due to the force of gravity. In this scenario, at low ambient temperatures and after the internal combustion engine 10 has been switched off, the condensate might also freeze. The collecting area of the reservoir 26 prevents liquid condensate droplets or ice from penetrating into the exhaust passage 18 downstream from the particulate filter 16, where they cause damage, in particular damage to the $NO_x$ sensor 50 located directly downstream from the reservoir 26. Due to the hot exhaust gas, the condensate captured in the collecting area of the reservoir 26 evaporates and then, in the form of vapor, gets into the exhaust passage through the opening 30 or the slit 32, thereby ruling out mechanical damage to components situated downstream from the reservoir 26. The reservoir 26 can be inexpensively made as a one-piece stamped-bent part or as deep-drawn part, although it is also possible to assemble the reservoir 26 out of several parts and to join these using a positive, non-positive or integrally bonded technique.

Figure 6:
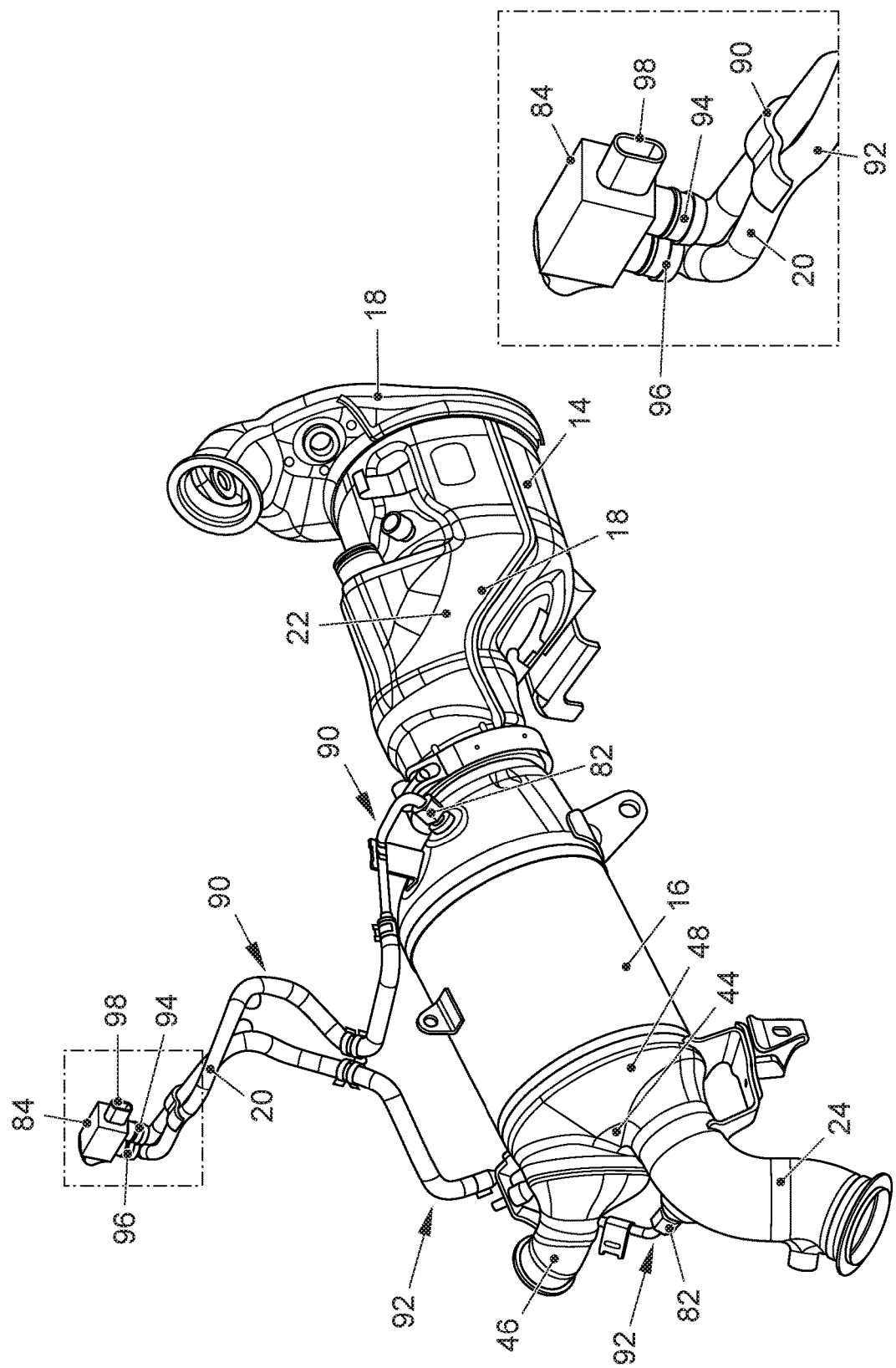
FIG. 6 is an exhaust system according to the invention, with a particulate filter and a differential pressure line, in a three-dimensional view.

FIG. 6 shows another embodiment of an exhaust system according to the invention with a particulate filter 16. With an essentially identical structure as shown in FIG. 2, the connection of the differential pressure line 20 to the exhaust passage 18 upstream and downstream from the particulate filter 16 is shown in this view. Here, a first section 90 of the differential pressure line 20 connects the first section 22 of the exhaust passage 18 to a first inlet 94 of the differential pressure sensor 84. A second section 92 of the differential pressure line 20 connects the second section 24 of the exhaust passage 18 downstream from the particulate filter 16 to a second inlet 96 of the differential pressure sensor 84. As a result, a pressure differential can be ascertained in the exhaust passage 18 before and after the particulate filter 16, said value serving as the measure of the loading of the particulate filter 16. The differential pressure sensor 84 is also provided with an electric contact 98 in order to transmit the pressure signal from the differential pressure sensor 84 to the control unit 58.

LIST OF REFERENCE NUMERALS 10 internal combustion engine
12 exhaust system
14 first catalytic converter
16 particulate filter
18 exhaust gas passage
20 differential pressure line
22 first section of the exhaust passage
24 second section of the exhaust passage
26 reservoir
28 liquid
30 opening
32 slit
34 trailing edge
36 wall
38 downstream end of the differential pressure line
40 filter body
42 metal sheet
44 branch
46 low-pressure exhaust-gas return line
48 exhaust-gas funnel
50 $NO_x$ sensor
52 outlet
54 exhaust-gas turbocharger
58 turbine
58 control unit
60 metering module
62 reducing agent tank
64 reducing agent
66 SCR coating
68 second funnel
70 filter element
72 third funnel
74 exhaust-gas valve
76 additional catalytic converter
78 tailpipe
80 exhaust-gas mixer
82 connecting piece
84 differential pressure sensor
86 temperature sensor
88 particle sensor
90 first section of the differential pressure line
92 second section of the differential pressure line
94 first inlet of the differential pressure sensor
96 second inlet of the differential pressure sensor
98 electric contact
D distance

The invention claimed is:

1. An exhaust system for an internal combustion engine, comprising:
    an exhaust passage,
    a particulate filter arranged in the exhaust passage, and
    a differential pressure line which connects a first section of the exhaust passage upstream from the particulate filter and/or a second section of the exhaust passage downstream from the particulate filter to a differential pressure sensor,
    wherein, at an end of the differential pressure line facing the exhaust passage, a reservoir that is fluidically connected to the exhaust passage is formed which protrudes into the exhaust passage,
    whereby the reservoir can be heated up by the exhaust gas of the internal combustion engine in such a way that liquid that has collected in the reservoir evaporates before exiting into the exhaust passage, after which it is introduced in gaseous form into the exhaust passage.

2. The exhaust system according to claim 1, wherein a $NO_x$ sensor that detects the nitrogen oxide concentration, a temperature sensor or a particle sensor is arranged in the exhaust system downstream from the reservoir.

3. The exhaust system according to claim 2, wherein the $NO_x$ sensor, the temperature sensor or the particle sensor is arranged at a distance of 120 mm to 1500 mm downstream from the filter body of the particulate filter.

4. The exhaust system according to claim 1, wherein an opening or a slit is formed on the reservoir so that the liquid that has collected in the reservoir can be released into the exhaust passage in a controlled manner.

5. The exhaust system according to claim 4, wherein the opening or the slit is configured such that the liquid is prevented from exiting the opening or the slit due to gravity, whereas a gaseous medium can escape into the exhaust passage through the opening or the slit.

6. The exhaust system according to claim 1, wherein a trailing edge is formed on the reservoir in order to prevent a volume flow from the reservoir from accumulating on a wall of the exhaust passage.

7. The exhaust system according to claim 1, wherein the downstream end of the differential pressure line opens up into an exhaust-gas funnel directly downstream from a filter body of the particulate filter.

8. The exhaust system according to claim 1, wherein the differential pressure line branches off from the exhaust passage upstream from a branch for a low-pressure exhaust-gas return line and it once again opens up into the exhaust passage downstream from the branch for the low-pressure exhaust-gas return line.

9. The exhaust system according to claim 8, wherein the metal sheet, the cast part, the lathed part or the milled part is screwed into the exhaust passage.

10. The exhaust system according to claim 8, wherein the metal sheet, the cast part, the lathed part or the milled part is positively and/or non-positively joined to the differential pressure line.

11. The exhaust system according to claim 1, wherein the reservoir is made of sheet metal, a cast part, a lathed part or a milled part.

12. A method for the after-treatment of the exhaust gas of an internal combustion engine, comprising:

conveying the exhaust gas of the internal combustion engine through an exhaust system having an exhaust passage, cleaning the exhaust gas of the internal combustion engine by a particulate filter, whereby the exhaust system has a differential pressure line that connects a first section of the exhaust passage upstream from the particulate filter and/or a second section of the exhaust passage downstream from the particulate filter to a differential pressure sensor, wherein, at an end of the differential pressure line facing the exhaust passage, a reservoir that is fluidically connected to the exhaust passage is formed which protrudes into the exhaust passage, whereby the reservoir is heated up by the exhaust gas of the internal combustion engine in such a way that liquid that has collected in the reservoir evaporates before exiting into the exhaust passage, after which it is introduced in gaseous form into the exhaust passage.

* * * * *